(12) United States Patent
Fraser

(10) Patent No.: US 12,459,801 B2
(45) Date of Patent: Nov. 4, 2025

(54) BEVERAGE DISPENSER ADAPTER

(71) Applicant: Farmer Brothers Co., Northlake, TX (US)

(72) Inventor: James Fraser, Plymouth, TX (US)

(73) Assignee: Farmer Brothers Co., Northlake, TX (US)

(*) Notice: Subject to any disclaimer, the term of this patent is extended or adjusted under 35 U.S.C. 154(b) by 208 days.

(21) Appl. No.: 18/238,355

(22) Filed: Aug. 25, 2023

(65) Prior Publication Data

US 2024/0253963 A1 Aug. 1, 2024

Related U.S. Application Data

(60) Provisional application No. 63/441,821, filed on Jan. 29, 2023.

(51) Int. Cl.
| | |
|---|---|
| *B67D 1/00* | (2006.01) |
| *A47J 31/40* | (2006.01) |
| *A47J 31/44* | (2006.01) |
| *A47J 31/46* | (2006.01) |
| *B67D 1/08* | (2006.01) |
| *B67D 1/10* | (2006.01) |

(52) U.S. Cl.
CPC .......... *B67D 1/0021* (2013.01); *A47J 31/40* (2013.01); *A47J 31/402* (2013.01); *A47J 31/404* (2013.01); *A47J 31/44* (2013.01); *A47J 31/468* (2018.08); *B67D 1/0871* (2013.01); *B67D 1/0888* (2013.01); *B67D 1/10* (2013.01)

(58) Field of Classification Search
CPC .......... B67D 1/0021; B67D 1/10; A47J 31/40; A47J 31/41; A47J 31/44; A47J 31/46; A47J 31/402; A47J 31/404; A47J 31/405; A47J 31/407; A47J 31/468
See application file for complete search history.

(56) References Cited

U.S. PATENT DOCUMENTS

| | | | |
|---|---|---|---|
| 5,797,519 | A | 8/1998 | Schroeder et al. |
| 11,464,354 | B2 * | 10/2022 | Di Maria ............... B01F 23/53 |
| 2007/0009365 | A1 | 1/2007 | Litterst et al. |
| 2011/0301768 | A1 | 12/2011 | Hammonds et al. |
| 2016/0183715 | A1 | 6/2016 | Showalter |

FOREIGN PATENT DOCUMENTS

DE 102018114853 A1 * 12/2019

OTHER PUBLICATIONS

International Search Report and Written Opinion for PCT/US24/13352 dated Apr. 21, 2024, 6 pages.

* cited by examiner

*Primary Examiner* — Jennifer C Chiang
(74) *Attorney, Agent, or Firm* — Braxton Perrone, PLLC; Gregory Perrone; Bobby W. Braxton

(57) ABSTRACT

A beverage dispenser adapter having at least one pump having a connector for electrical connection to an induction coil in the dispenser base dispensing a predefined amount of formula for mixing with a liquid, a formula carton connector for connecting a carton containing formula for beverage preparation, an elongated dispensing tube in a housing for fitting within the induction coil, and a controller for controlling amounts and ratios of formula and liquid upon selection of a beverage by a user.

22 Claims, 6 Drawing Sheets

BEVERAGE DISPENSER ADAPTER

PRIORITY CLAIM

This application claims priority to U.S. Provisional Patent Application No. 63/441,821 filed Jan. 29, 2023, which is incorporated herein by reference in its entirety.

BACKGROUND OF THE INVENTION

Field of the Disclosure

The claimed subject matter relates to dispensers for dispensing liquid beverages. In particular, the presently described dispenser provides a universal adapter enabling dispensing of beverages from a flavored base such as freeze dried, powder or other composition that is mixed with liquid. The adapter presently described allows dispensing of formulae manufactured and packaged by different sources from a single dispensing unit.

SUMMARY OF THE INVENTION

A beverage dispenser adapter is disclosed according to the embodiments of the invention. The adapter comprises a case having one or more induction coil connectors configured to dispense various quantities of pre-packaged beverage formula that for mixing with fluid, such as water, for ultimate dispensing into a cup upon selection by a user. An example of the context of use for the presently described beverage dispenser adapter is a vending or a food service area where a user requests a particular beverage, such a coffee. In one embodiment, a user selects a strength and/or type of a beverage, such a coffee. In preparation of such user selection, an operator installs a carton containing pre-packaged formula within the carcass of a dispensing machine. The carton is placed on a platform within which is one or more peristaltic pumps are situated. Each such pumps draws the pre-mixed formula from the carton and causes it to flow through a tube and through an aperture for mixing with liquid, such as hot water, and ultimate dispensing into a user's cup. The pump includes an input tube through which the pre-mixed formula is drawn and an output tube for introducing the formula to the liquid. The input pump tube interfaces with the formula carton through a connector sized to mate with an input port of the carton.

The adapter includes a controller including code for providing operational functionality for the dispenser. That is, the controller causes the dispenser to release a finite amount or ratio of premixed formula according to the formula in use in the vending machine as well as according to the size of the beverage selected or the strength of the beverage selected. The controller provides the functionality to permit use of the vending machine for many variations of pre-mixed formula and beverage types. This enables owners of vending devices limited to dispensing a single type of beverage or beverages using formula from a single source to dispense many types of beverages and beverages from various manufactures. The presently described adapter realizes significant cost savings for beverage sellers.

BRIEF DESCRIPTION OF THE DRAWINGS

The novel features believed characteristic of the invention are set forth in the appended claims. The invention itself, however, as well as a preferred mode of use, further objectives, and advantages thereof, will be best understood by reference to the following detailed description of illustrative embodiments when read in conjunction with the accompanying drawings, wherein:

DETAILED DESCRIPTION

Before undertaking the detailed description below, it may be advantageous to set forth definitions of certain words and phrases used in connection to the disclosed exemplary embodiments: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Although the subject matter of this application has been described with reference to illustrative embodiments, this description is not intended to be construed in a limiting sense. Various modifications and combinations of the illustrative embodiments as well as other embodiments will be apparent to persons skilled in the art upon reference to the description. It is, therefore, intended that the appended claims encompass any such modifications or embodiments. The general processes and systems described herein may be modified heavily depending on a number of factors, with rearrangement and/or addition/deletion of steps anticipated by the scope of the present disclosure. Integration of this and other preferred exemplary embodiment methods in conjunction with a variety of preferred exemplary embodiment systems described herein is anticipated by the overall scope of the presently disclosed system.

Figure 1:
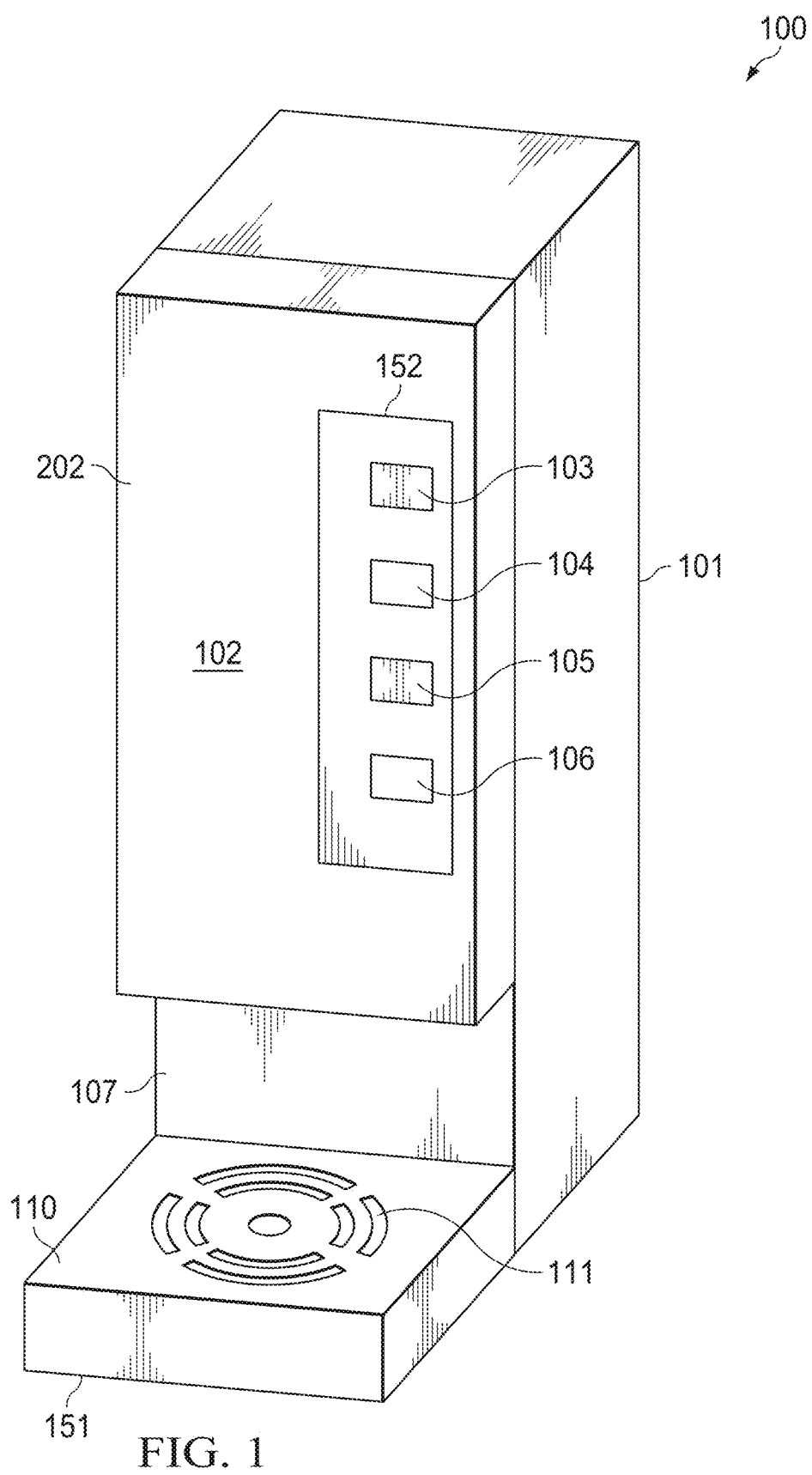
FIG. 1 is a perspective view of the exterior of a beverage dispenser in which the presently described adapter is used according to an embodiment of the invention.

FIG. 1 is a perspective view of the exterior of a beverage dispenser in which the presently described adapter is used according to an embodiment of the invention. In FIG. 1, beverage dispenser 100 is a known electronic device for dispensing beverages, such as coffee. Beverage dispenser 100 comprises in one embodiment an elongated tower portion 101 and a base portion 151. Within elongated tower portion 101 is a hollow area (shown in FIG. 2) for containment of the electronic components of the dispenser, as well as premixed beverage formula, which will be described. On front panel 102 is product selection area 152. In one embodiment, product selection area 152 comprises selection buttons 103, 104, 105 and 106 for coffee strength, with three of the selection buttons designated for coffee strength such as light selection button 103, medium selection button 104 and bold selection button 105. Also, water selection button 106 causes dispensing of hot water. In the alternative, selection buttons 103, 104 and 105 denote beverage size, such as small eight ounce, medium twelve ounce and large sixteen ounce or other pre-selected sizes. Behind front panel 102 is interior area 202, which is not visible from the front of beverage dispenser 100, thus, shown in dashed lines and in more detail in FIG. 2.

Continuing with FIG. 1, beverage dispenser 100 within base 151 includes a spillage plate 110 that includes slot arrangement 111. Spillage plate 110 covers an empty space in which spilled beverage coming from one of beverage nozzles (not shown) disposed in dispensing area 107 is collected. Beverage nozzles deliver beverage to a cup placed within dispending area 107 according to the user's selection via the selection buttons as described. Other arrangements and placements of the various user selection buttons, dispensing area and beverage nozzles are contemplated that continue to achieve basic beverage dispensing operations.

Figure 2:
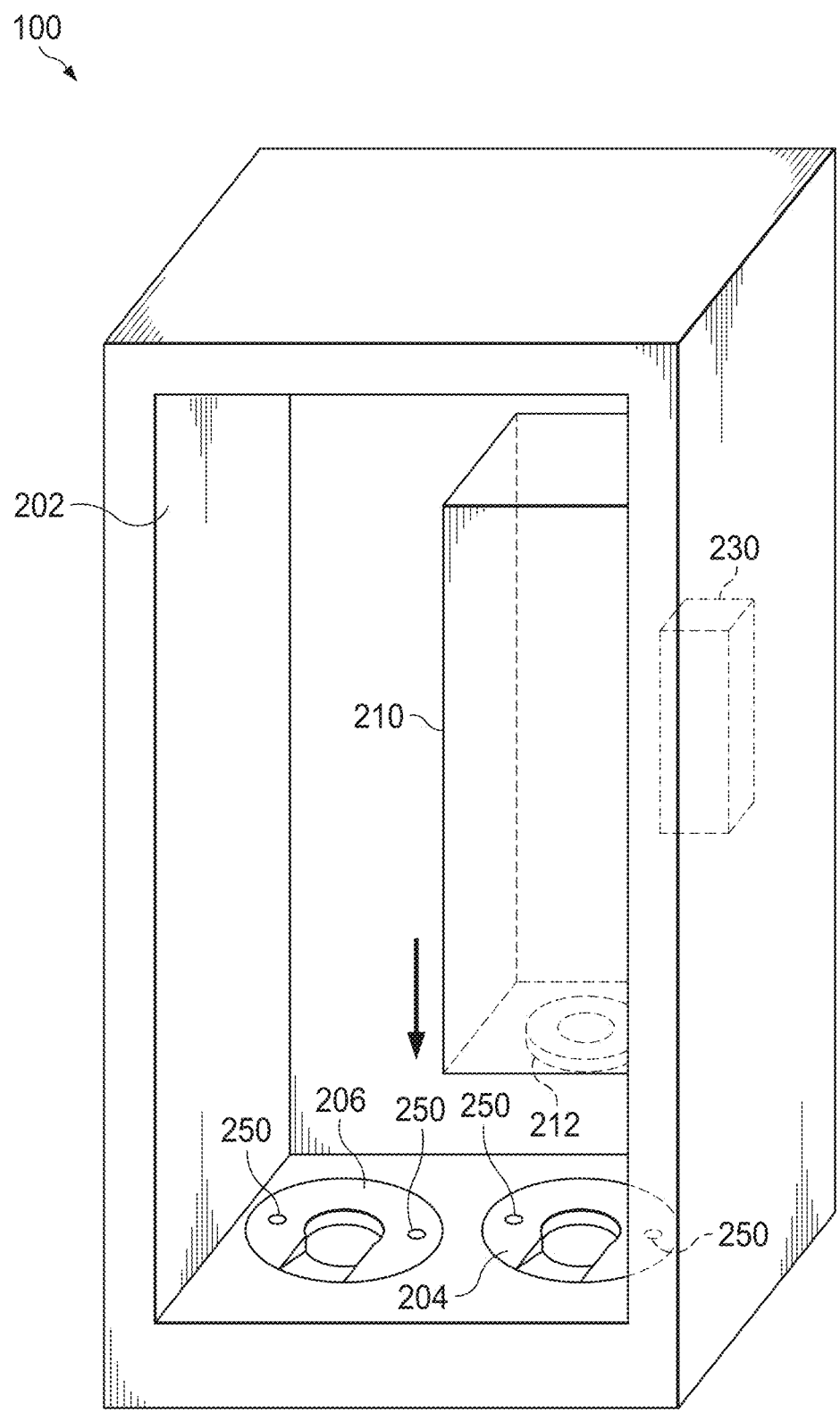
FIG. 2 is a perspective view of the interior beverage formula area of beverage dispenser in which the presently described adapter is used according to an embodiment of the invention.

FIG. 2 is a perspective view of the interior beverage formula area of a beverage dispenser in which the presently described adapter is used according to an embodiment of the invention. In FIG. 2, interior shell 202 of beverage dispenser 100 is shown. Interior shell 202 resides behind front panel 102 of beverage dispenser 100. Interior shell is largely an empty space in which one or more cartons 210 are placed. Cartons 210 in one embodiment contain pre-mixed formula, such as freeze-dried formula or other dry or semi-liquid formula for mixing with hot water to dispense a coffee beverage. Carton 210 includes a lower connection interface 212 sized to mate with a corresponding coil 204. In one embodiment, a second coil 206 is located at the bottom of interior shell 202 to accommodate a second carton 210. The coils produce a high voltage pulse from a low voltage current supply. As will be discussed, the pulse generated by the coils invoke operation of peristaltic pumps in the adapter to draw desired amounts of pre-mixed formula to prepare a selected beverage.

As shown, carton 210 is lowered onto coil 204. A controller 230 (obscured by interior shell 202 and depicted in dashed lines) includes logic to control the amount of formula dispensed from carton 210 to be mixed with water to make the desired beverage of the size and strength selected by the user. In this prior art beverage dispenser 100, only formula is dispensed from the specific source of the mix in carton 210 in an amount pre-set in controller 230. That is, formulae from other sources requiring formula to water mixing ratios other then those of the machine's source can be dispensed. Also, lower connection interface 212 only operates in conjunction with coil 204. The presently described adapter, discussed in detail below, solves the problem of the beverage dispenser 100 only dispensing beverages from a particular formula source.

Figure 3:
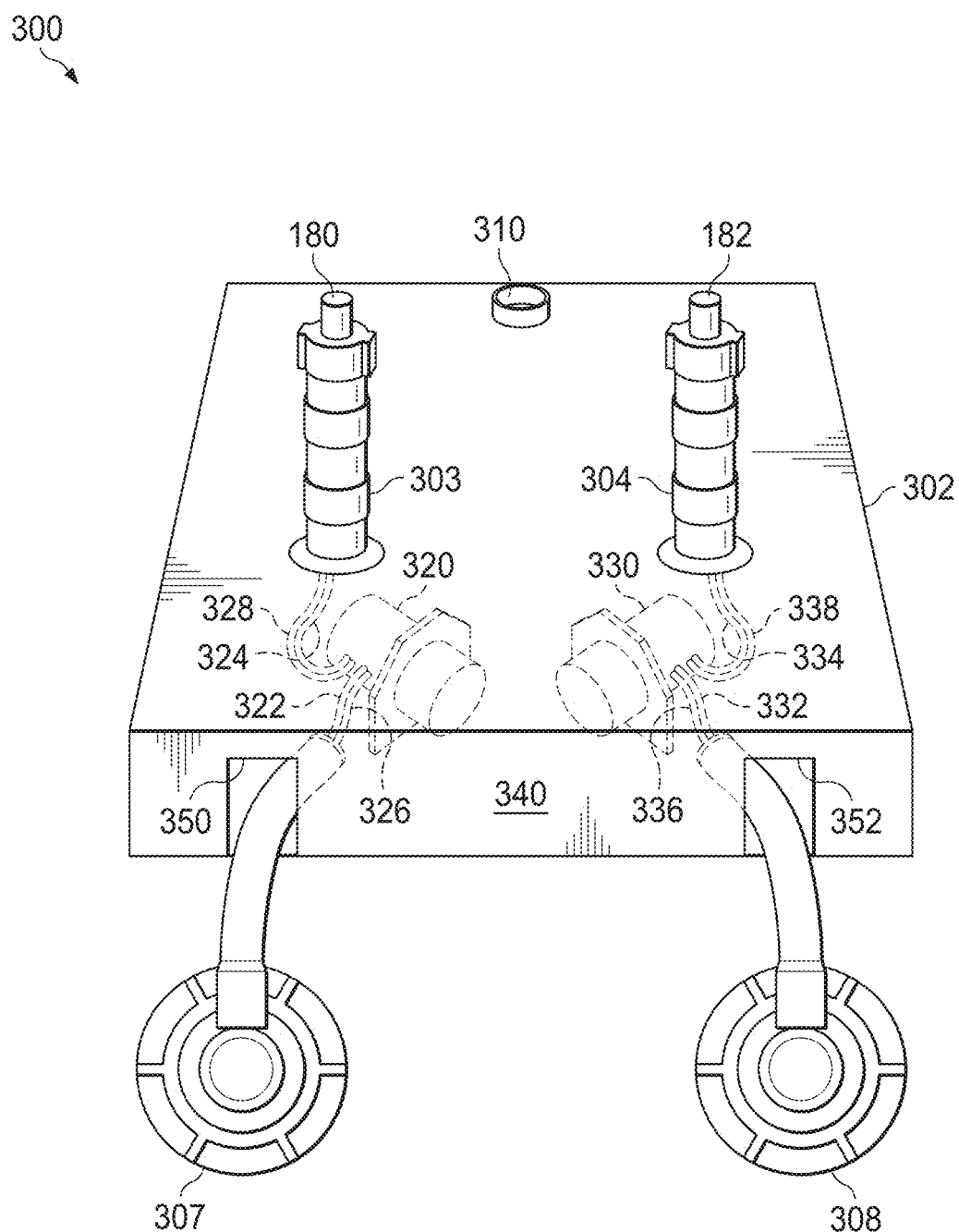
FIG. 3 is a perspective view of a beverage dispenser adapter according to an embodiment of the invention.

FIG. 3 is a perspective view of a beverage dispenser adapter according to an embodiment of the invention. In FIG. 3 dispenser adapter 300 comprises case 302 in which the various components of adapter 300 are housed or extend from. Case 302 is largely rectangular in shape and is sized to fit within the floor of interior shell 201 of beverage dispenser 100. Adapter 300 is depicted in an inverted position for ease of illustration.

Adapter 300 includes, in one embodiment, a first nozzle extension 303 and a second nozzle extension 304, each of which extends from the bottom face of case 302. Disposed on a distal end of each of first nozzle extension 303 and second nozzle extension 304, respectively, is first nozzle tip 180 and second nozzle tip 182. When adapter 300 is installed in beverage dispenser 100 as described, first nozzle tip 180 and second nozzle tip 182 extend into dispensing area 107 (FIG. 1), causing the beverage to be dispensed in the user's cup as expected.

Continuing, first nozzle extension 303 and second nozzle extension 304 are connected to a first pump 320 and a second pump 330. In one embodiment, first pump 320 and second pump 330 are twenty-four volt peristaltic pump. First pump 320 includes first inflow port 326 and first outflow port 328. Second pump 330 includes second inflow port 336 and second outflow port 338. First inflow port 326 is connected to first carton interface 307 by first inflow tube 305. First inflow port 326 in one embodiment is a male or female threaded connector that is fastened to a corresponding female or male threaded spout affixed on a carton enabling flow of beverage formula out of an associated carton.

Second inflow port 336 is connected to second carton interface 308 by second inflow tube 306. Similarly, second inflow port 336 in one embodiment is a male or female threaded connector that is fastened to a corresponding female or male threaded spout affixed on a carton enabling flow of beverage formula out of an associated carton.

First outflow port 324 of first pump 320 is connected to an upper end of first nozzle extension 303 by first outflow tube 328. Second outflow port 334 of second pump 330 is connected to an upper end of second nozzle extension 304 by second outflow tube 338.

According to instructions in the form of source code stored in or available to controller 230, required amounts of formula are dispensed from installed cartons connected to first carton interface 307, with formula drawn from the associated carton by the associated first pump 320, through first inflow tube 326, through first inflow port 322, and then once mixed with liquid according to the selected formula ratio, is pumped out through first outflow port 324, through first outflow tube 328 to first extension nozzle 303. The mixed beverage travels through first extension nozzle 303 and exits it from first nozzle tip 180 and into the user's cup.

According to instructions in the form of source code stored in or available to controller 230, required amounts of formula are dispensed from installed cartons connected to second carton interface 308, with formula drawn from the associated carton by the associated second pump 330, through second inflow tube 336, through second inflow port 332, and then once mixed with liquid according to the selected formula ratio under the control of controller 230, is pumped out through second outflow port 344, through second outflow tube 338 to second extension nozzle 304. The mixed beverage travels through second extension nozzle 304 and exits it from second nozzle tip 182 and into the user's cup.

The presently described adapted is powered electrically. Cable port 310 enables connection of an appropriate power cable and communications cable to the controller, the first and second pump and other electrical components of the beverage dispenser 100, including adapter 300. Within front panel 340 of case 320 are first aperture 350 through which first inflow tube 350 enters case 320 and second aperture 352 through which second inflow tube 352 enters case 320.

Figure 4:
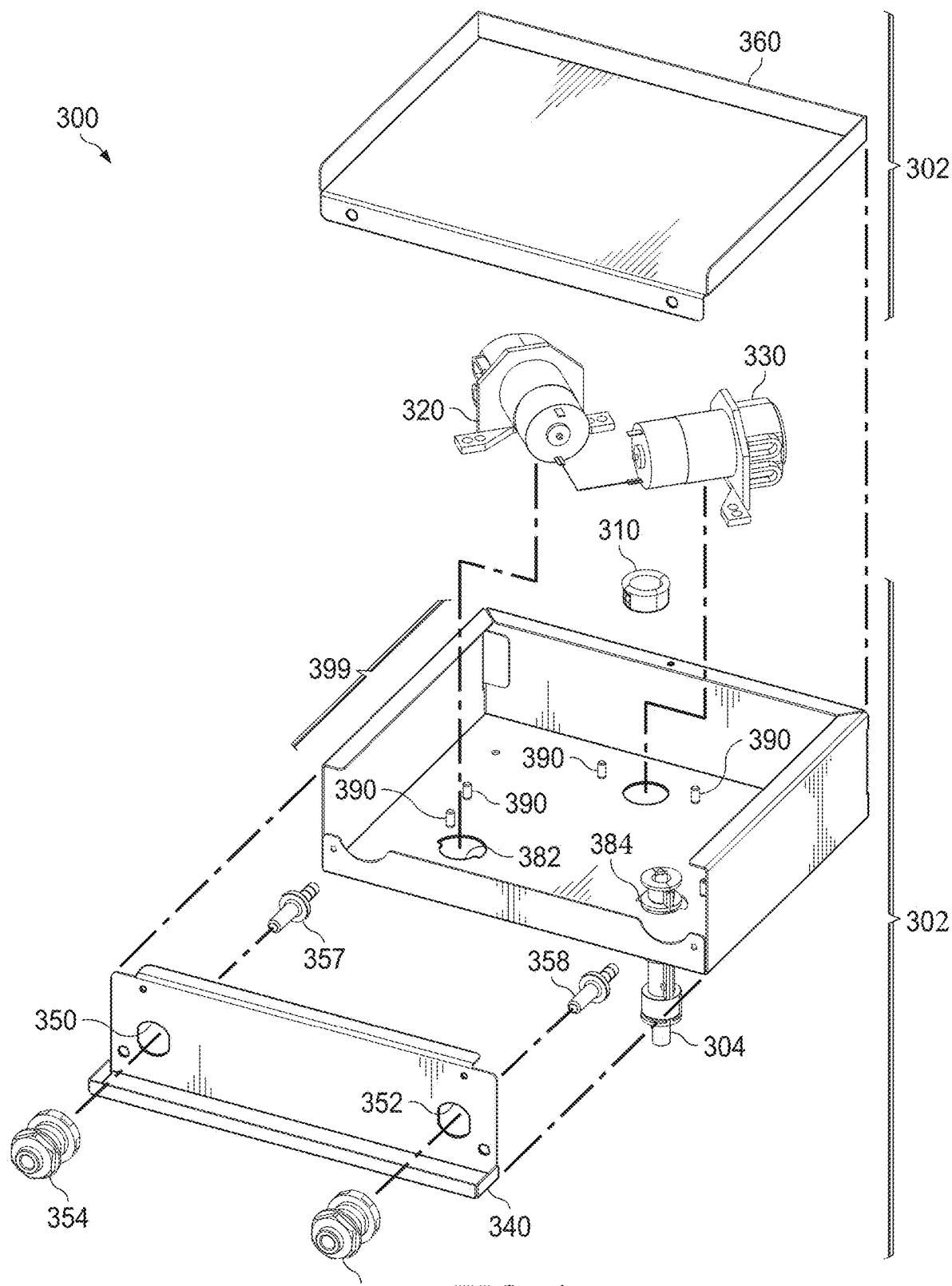
FIG. 4 is a perspective view of components of a beverage dispenser adapter according to an embodiment of the invention.

FIG. 4 is a perspective view of components of a beverage dispenser according to an embodiment of the invention. In FIG. 4, case 302 of adapter 300 is shown disassembled. Case 302 includes main body portion 399, lid 360 and front panel 340. As described, first aperture 350 and second aperture 352 are disposed on front panel 340. Securing harnesses 354 and 356 are disposed within first aperture 350 and second aperture 352 to keep secure inflow tubes passing through.

First nipple 357 and second nipple 358 connect first inflow tube 326 to one of securing harness 354 and second inflow tube 336 to another securing harness 354. Third aperture 382 and fourth aperture 384 are disposed within the bottom face of main body portion 399 of case 302 for receipt of first nozzle extension 303 and second nozzle extension 304 (shown). First pump 320 and second pump 330 are disposed within case to facilitate flow of premixed formula for beverage preparation and outflow of the prepared beverage.

A liquid source, such as a water line, is provided for mixing of pre-packaged formula with the liquid to prepare the final beverage product. The liquid is introduced to the pre-mixed formula retrieved by the pump through the inflow tubes and port. The amount of formula introduced to the beverage preparation process for mixing with liquid is controlled by the controller. The controller in one embodiment is a microprocessor with stored instructions that upon operator selection determine the amount of pre-mixed formula drawn from carton 210 by the pump through the inflow tube. The controller also causes water to be added to the mix from a connected source such a water line having a valve controlled by the controller. The amount of liquid to formula ratio is embodied in the code associated with the controller. The code enables user selection of various pre-mixed formula items for preparation of various beverages of different types, sizes and strengths. The presently described adapter and controller enable use of the standard dispenser for multiple products rather than one.

Figure 5:
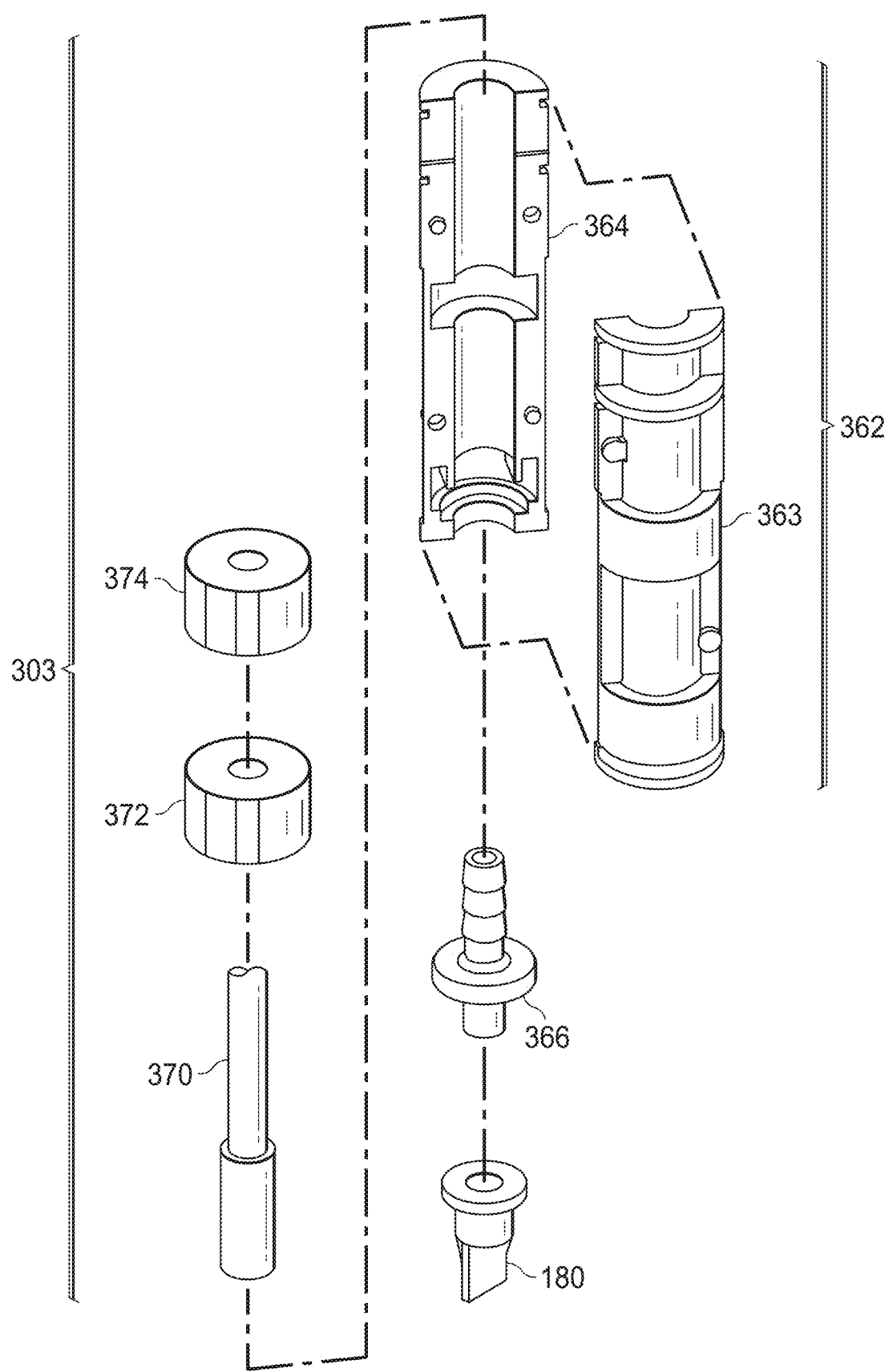
FIG. 5 is a perspective view of a nozzle extension assembly of a beverage dispenser adapter according to an embodiment of the invention.

FIG. 5 is a perspective view of components of a nozzle extension of a beverage dispenser adapter according to an embodiment of the invention. At the core of first nozzle extension 303 is elongated tube 370. Elongated tube 370 is housed within elongated shell 362. Elongated shell 362 serves to provide a tight fit of nozzle extension 303 within coil 204 of beverage dispenser 100 and protect elongated tube 370. Elongated shell 362 in one embodiment is a two-part structure with first shell half 362 and second shell half 364. In the alternative, elongated shell is a one-piece structure.

Disposed at a lower end of elongated tube 370 is nipple 366 for direct connection to elongated tube 370 and first nozzle tip 180. Second nozzle extension 304 is comprised of the same components. When adapter 300 is installed, first nozzle tip 180 and second nozzle tip 182 extend downward into dispensing area 107, enabling unobstructed dispensing of prepared beverage into the user's cup placed beneath the nozzle tip.

First support collar 372 and second support collar 374 are placed at the upper end of elongated tube 370 to prevent movement of elongated tube 370 within coil 204. Elongated tube 370 passes through a corresponding opening within each support collar. In one embodiment first support collar 372 and second support collar 374 are clear, as is the elongated tube. This permits a sensor apparatus within coil 204 to sense when there is formula passing through the outflow tube. That is, the sensor causes an indication that the carton containing pre-mixed formula is empty.

Returning to FIG. 1, coils 204 and 206 include connection ports 250. These ports receive corresponding electrical connectors associated with first pump 320 and second pump 330. This connection completes the circuit that enables operation of coils 204 and 206 when a carton of pre-mixed formula is installed and dispensing of designated formula amount.

Returning to FIG. 4, adapter 300 of the presently described system further comprises electrical connectors 390 for receipt by corresponding connector ports 250 in coils 204 and 206 (as shown in FIG. 2). Electrical connectors 390 form an electrical connection between first pump 320 and second pump 330 and first coil 204 and second coil 206, respectively (as shown in FIG. 2). This electrical connection allows controller 230 to control operation of pumps 320 and 330 that, in turn, control the amount of formula drawn from the installed carton and mixed with the appropriate amount of liquid according to the controller's coded instructions. The adapter's connectors 390 and pumps 320 and 330 make dispenser a universal dispenser able to mix and dispense beverages sourced to any number of sources.

Figure 6:
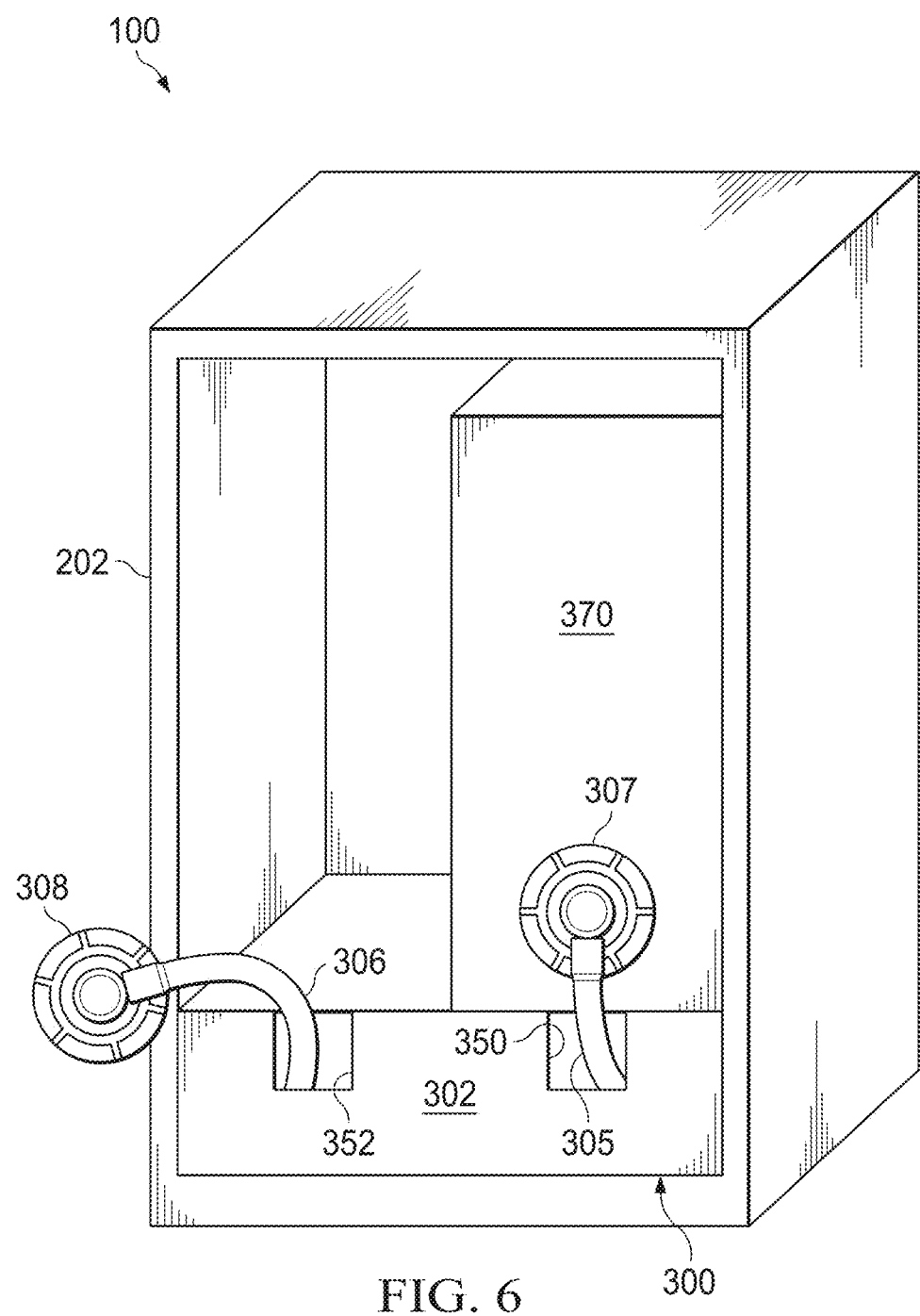
FIG. 6 is a perspective view of an installed adapter of a beverage dispenser according to an embodiment of the invention.

FIG. 6 is a perspective view of an installed adapter of a beverage dispenser according to an embodiment of the invention. As shown in FIG. 6, beverage dispenser 100 has installed adapter 300, with case 302 installed at the bottom of interior area 202. Carton 700 has first carton interface 307 attached to its corresponding lower connection interface on the carton (not shown). First inflow tube 305 comes out of case 302 through first aperture 350 for drawing of formula from carton 700 for beverage preparation. Second carton interface 308 is unused in this figure, but can accommodate a second carton of the same or different pre-mixed formula. Second inflow tube 306 comes from case 302 through second aperture 352.

The above summary is not intended as an exhaustive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description. Although various embodiments of the present disclosure have been illustrated in the accompanying drawings and described in the foregoing Detailed Description, it will be understood that the present system is not limited to the embodiments disclosed, but is capable of numerous rearrangements, modifications, and substitutions without departing from the spirit of the system as set forth and defined herein.

Additional Disclosure

Clause 1. A beverage dispenser apparatus, comprising:
  an adapter housing containing a first pump having a first connector for electrical connection to a first induction coil disposed in an interior of a beverage dispenser;
  a first formula carton connector for connecting a first carton containing formula for beverage preparation;
  a first elongated dispensing assembly in a housing for fitting within the first induction coil, comprising a first elongated tube, a first nipple disposed at a proximate end of the first elongated tube, a first nozzle tip connected to the first nipple, a first annular support collar and a second annular support collar; and
  a controller for controlling amounts and ratios of formula and liquid upon selection of a beverage by a user.

Clause 2. The beverage dispensing apparatus of any proceeding or preceding clause, further comprising a first sensor disposed within the first induction coil to cause an indication of the absence of formula in the first carton.

Clause 3. The beverage dispensing apparatus of any proceeding or preceding clause, wherein the first annular support collar and the second annular support collar are made of a clear material.

Clause 4. The beverage dispensing apparatus of any proceeding or preceding clause, wherein the elongated dispensing assembly further comprises an elongated tube shell.

Clause 5. The beverage dispensing apparatus of any proceeding or preceding clause, wherein the elongated tube shell is at least a two-part structure.

Clause 6. The beverage dispensing apparatus of any proceeding or preceding clause, wherein the first pump comprises a peristaltic pump.

Clause 7. The beverage dispensing apparatus of any proceeding or preceding clause, further comprising a second pump first pump having a connector for electrical connection to a second induction coil disposed in the interior of a beverage dispenser.

Clause 8. The beverage dispensing apparatus of any proceeding or preceding clause, wherein the second pump comprises a peristaltic pump.

Clause 9. The beverage dispensing apparatus of any proceeding or preceding clause, further comprising a first inflow tube connected to a first port of the first pump and a first outflow tube connected to a second port of the first pump.

Clause 10. The beverage dispensing apparatus of any proceeding or preceding clause, wherein the first formula carton connector is disposed on a proximate end of the first inflow tube.

Clause 11. The beverage dispensing apparatus of any proceeding or preceding clause, further comprising a second inflow tube connected to a first port of the second pump and a second outflow tube connected to a second port of the second pump.

Clause 12. The beverage dispensing apparatus of any proceeding or preceding clause, further comprising a second formula carton connector, for connecting a second carton containing formula for beverage preparation, disposed on a proximate end of the second inflow tube.

Clause 13. The beverage dispensing apparatus of any proceeding or preceding clause, wherein the first outflow tube is connected to a first end of the first elongated tube.

Clause 14. The beverage dispensing apparatus of any proceeding or preceding clause, wherein the first end of the first elongated tube passes through the first annular support collar and the second annular support collar.

Clause 15. The beverage dispensing apparatus of any proceeding or preceding clause, further comprising a second elongated dispensing assembly in a housing for fitting within a second induction coil, comprising a second elongated tube, a second nipple disposed at a proximate end of the second elongated tube, a second nozzle tip connected to the second nipple, a third annular support collar and a fourth annular support collar.

Clause 16. The beverage dispensing apparatus of any proceeding or preceding clause, wherein the first end of the second elongated tube passes through the third annular support collar and the fourth annular support collar.

Clause 17. The beverage dispensing apparatus of any proceeding or preceding clause, wherein the third annular support collar and the fourth annular support collar are made of a clear material.

Clause 18. The beverage dispensing apparatus of any proceeding or preceding clause, wherein the second outflow tube is connected to a first end of the second elongated tube.

Clause 19. The beverage dispensing apparatus of any proceeding or preceding clause, wherein the second formula carton connector is disposed on a proximate end of the second inflow tube.

Clause 20. The beverage dispensing apparatus of any proceeding or preceding clause, wherein the second formula carton connector connects to a second connection interface at a base of the second formula carton.

Clause 21. The beverage dispensing apparatus of any proceeding or preceding clause, wherein the first formula carton connector connects to a first connection interface at a base of the first formula carton.

Clause 22. The beverage dispensing apparatus of any proceeding or preceding clause, further comprising a second sensor disposed within the second induction coil to cause an indication of the absence of formula in the second carton.

I claim:

1. A beverage dispenser apparatus, comprising:
an adapter housing containing a first pump having a first connector for electrical connection to a first induction coil disposed in an interior of a beverage dispenser;
a first formula carton connector for connecting a first carton containing formula for beverage preparation;
a first elongated dispensing assembly in a housing for fitting within the first induction coil, comprising a first elongated tube, a first nipple disposed at a proximate end of the first elongated tube, a first nozzle tip connected to the first nipple, a first annular support collar and a second annular support collar; and
a controller for controlling amounts and ratios of formula and liquid upon selection of a beverage by a user.

2. The beverage dispensing apparatus of claim 1, further comprising a first sensor disposed within the first induction coil to cause an indication of the absence of formula in the first carton.

3. The beverage dispensing apparatus of claim 1, wherein the first annular support collar and the second annular support collar are made of a clear material.

4. The beverage dispensing apparatus of claim 1, wherein the elongated dispensing assembly further comprises an elongated tube shell.

5. The beverage dispensing apparatus of claim 4, wherein the elongated tube shell is at least a two-part structure.

6. The beverage dispensing apparatus of claim 1, wherein the first pump comprises a peristaltic pump.

7. The beverage dispensing apparatus of claim 1, further comprising a second pump first pump having a connector for electrical connection to a second induction coil disposed in the interior of a beverage dispenser.

8. The beverage dispensing apparatus of claim 7, wherein the second pump comprises a peristaltic pump.

9. The beverage dispensing apparatus of claim 8, further comprising a first inflow tube connected to a first port of the first pump and a first outflow tube connected to a second port of the first pump.

10. The beverage dispensing apparatus of claim 9, wherein the first formula carton connector is disposed on a proximate end of the first inflow tube.

11. The beverage dispensing apparatus of claim 10, further comprising a second inflow tube connected to a first port of the second pump and a second outflow tube connected to a second port of the second pump.

12. The beverage dispensing apparatus of claim 11, further comprising a second formula carton connector, for connecting a second carton containing formula for beverage preparation, disposed on a proximate end of the second inflow tube.

13. The beverage dispensing apparatus of claim 9, wherein the first outflow tube is connected to a first end of the first elongated tube.

14. The beverage dispensing apparatus of claim 13, wherein the first end of the first elongated tube passes through the first annular support collar and the second annular support collar.

15. The beverage dispensing apparatus of claim 11, further comprising a second elongated dispensing assembly in a housing for fitting within a second induction coil, comprising a second elongated tube, a second nipple disposed at a proximate end of the second elongated tube, a second nozzle tip connected to the second nipple, a third annular support collar and a fourth annular support collar.

16. The beverage dispensing apparatus of claim 15, wherein the first end of the second elongated tube passes through the third annular support collar and the fourth annular support collar.

17. The beverage dispensing apparatus of claim 16, wherein the third annular support collar and the fourth annular support collar are made of a clear material.

18. The beverage dispensing apparatus of claim 17, wherein the second outflow tube is connected to a first end of the second elongated tube.

19. The beverage dispensing apparatus of claim 18, wherein the second formula carton connector is disposed on a proximate end of the second inflow tube.

20. The beverage dispensing apparatus of claim 19, wherein the second formula carton connector connects to a second connection interface at a base of the second formula carton.

21. The beverage dispensing apparatus of claim 10, wherein the first formula carton connector connects to a first connection interface at a base of the first formula carton.

22. The beverage dispensing apparatus of claim 12, further comprising a second sensor disposed within the second induction coil to cause an indication of the absence of formula in the second carton.

\* \* \* \* \*